Patented June 18, 1935

2,005,713

UNITED STATES PATENT OFFICE 2,005,713

PRODUCTION OF FLUORINATED ACYCLIC HYDROCARBONS

Lee Cone Holt, Edgemoor, Del., and Edwin Lorenzo Mattison, Pennsgrove, N. J., assignors to Kinetic Chemicals, Inc., Wilmington, Del., a corporation of Delaware No Drawing. Application February 2, 1933, Serial No. 654,970

11 Claims. (Cl. 260—162)

This invention relates to fluorine derivatives of acyclic hydrocarbons, more particularly to mono-fluoro derivatives, and a process for the production thereof.

It is an object of the present invention to provide a new and improved process for the production of fluoro derivatives of acyclic hydrocarbons. A further object is to provide a new and improved process for the production of halofluoro derivatives of acyclic hydrocarbons, and, particularly, of those that contain one atom of fluorine. A still further object is the provision of a new and improved process for the production of fluorine derivatives of methane by a reaction which proceeds smoothly and, if desired, may be operated continuously, under controlled conditions leading to the formation of mono-fluoro derivatives of methane to the exclusion or practically to the exclusion of more highly fluorinated methane derivatives. Other objects will appear hereinafter.

These objects are accomplished according to the present invention whereby fluoro derivatives of acyclic hydrocarbons are produced by reacting together hydrogen fluoride and a halogenated methane containing fluorine in the presence of only a relatively small amount of a fluorinating catalyst, such as an antimony halide.

While the invention is susceptible to considerable variation and modification in the manner of its practical application, particularly as regards the proportions of materials, conditions of temperature and pressure, and the exact method of procedure, the following examples, in which the parts are by weight, will serve to illustrate how the invention may be practiced.

Example I

Approximately 430 parts of a fluorinating catalyst were prepared by passing 30 parts of gaseous hydrogen fluoride into 450 parts of antimony pentachloride at about room temperature.

One hundred parts of this catalyst were added to 1150 parts of chloroform contained in a suitable tall cylindrical metal vessel and, while maintaining a temperature of 18° C. to 20° C., gaseous hydrogen fluoride was added to the chloroform at the rate of 5.0 parts per hour.

The evolved vapors were passed through warm scrubbers (35° C. to 40° C.) containing dilute caustic soda and 93% sulfuric acid, respectively. They were subsequently condensed by means of a brine cooled condenser maintained at a temperature of about −10° C. The liquid product consisted of a mixture of 0.7% difluoro-chloro methane, 70% fluoro-dichloro methane and 29.3% of chloroform. The yield of the mono-fluoro derivative, based upon consumed chloroform, was above 95%. The utilization of hydrogen fluoride was above 90% at various periods of the operation.

Example II

Three hundred parts of the catalyst prepared as described in Example I were added to 1200 parts of chloroform in a copper reaction vessel and hydrogen fluoride added at the rate of about five parts per hour. The reaction zone was maintained at a temperature of about 25° C. under atmospheric pressure. The vapors evolved during the reaction were scrubbed with dilute caustic soda to remove acidic gases and then dried with 93% sulfuric acid to remove water vapor. The resultant vapors were then condensed and recovered as in Example I to yield a product comprising substantially 4.5% difluoro-chloro methane, 65% fluoro-dichloro methane and 30.5% chloroform. The components of this mixture were separated by fractional distillation. The yield of monofluoro derivative, based on consumed chloroform was about 90%. The utilization of hydrogen fluoride varied from about 90% to 95%.

If desired, the chloroform which is separated from the condensate as above described may be returned to the reaction vessel for further fluorination.

Example III

Two hundred eighty parts of carbon tetrachloride and 32 parts of antimony pentachloride were mixed in a steel reaction vessel and hydrogen fluoride gas passed in at room temperature. A moderate evolution of hydrogen chloride occurred and, after about one-half hour of steadily passing in the hydrogen fluoride at the rate of about 1.0 part per hour, a reaction with the carbon tetrachloride gradually started, as evidenced by the formation of a gas insoluble in caustic. The hydrogen fluoride was continuously passed into the reaction vessel for another hour and the evolved vapors were removed from the reaction zone and passed through a dilute caustic soda solution and then through concentrated sulfuric acid. The resultant vapors were condensed, yielding a liquid comprising substantially monofluoro-dichloro methane having a boiling point of about 23° C. to about 24° C.

Example IV

An antimony pentafluorochloride was prepared by passing hydrogen fluoride into antimony pentachloride at room temperature until a product having a melting point of about 40° C. was obtained. Thirty-five parts of this product were then added to 140 parts of carbon tetrachloride and gaseous hydrogen fluoride was passed into the mixture at the rate of about 7.0 parts per hour, while maintaining a temperature in the reaction zone of about 18° C. to 20° C. The evolution of hydrogen chloride and a caustic soda insoluble condensable gas began at once. At intervals of thirty minutes 150 parts of additional carbon tetrachloride were added with no additional antimony pentafluorochloride. In all, 755 parts of carbon tetrachloride were used with the original 35 parts of antimony pentafluorochloride. The rate of reaction continued practically unchanged.

The evolved gases were scrubbed with an alkaline hydroxide solution, dried with sulfuric acid, and then condensed as previously described. A product comprising substantially monofluorotrichloro methane (b. p. 23.6° C.) was obtained.

When hydrogen fluoride gas was passed through liquid monofluoro-trichloro methane containing a small amount of the antimony pentafluorochloride catalyst under the conditions above described, no evidence of the formation of higher fluorinated bodies such as difluoro-dichloromethane was observed.

Example V

Two hundred parts of hexachloro ethane were dissolved in 1000 parts of trifluoro-trichloro ethane. To the hexachloro ethane-trifluoro-trichloro ethane solution there was added the completed reaction product obtained by the addition of 3.0 parts of hydrogen fluoride to 30 parts of antimony pentachloride. The resultant mixture was heated to 30° C., and its agitation was started. A total of 20 parts of substantially anhydrous hydrogen fluoride gas was added to the mixture during a period of five hours. A water-cooled reflux condenser returned the greater part of any trifluoro-trichloro ethane that was volatilized from the reaction.

The completed reaction mass was subjected to distillation. There were obtained unconsumed trifluoro-trichloro ethane, fluoro-pentachloro ethane (b. p. about 1398° C.) and some difluoro-tetrachloro ethane (b. p. about 92° C.).

Alternatively, the completed reaction mass was washed successively with dilute hydrochloric acid, water and dilute alkali, and the greater part of the trifluoro-trichloro ethane was then removed by distillation. Upon suitable cooling there was obtained a crystalline mass consisting primarily of fluoro-pentachloro ethane.

While the invention is especially desirable for the production of monofluoro-chloro derivatives of methane, such as those described in the examples, it may also be applied to the production of other fluoro derivatives of acyclic hydrocarbons as, for example, monofluoro-bromo methanes. It will be recognized that the character of the compounds to be fluorinated will depend upon the products desired. In general, the invention is applicable to the fluorination of halogenated acyclic hydrocarbons containing chlorine, bromine and/or iodine atoms. The replacement by fluorine of bromine or iodine normally requires less rigorous conditions than the replacement of chlorine by fluorine. As specific examples of compounds which may be fluorinated in accordance with the invention may be mentioned carbon tetrachloride, chloroform, bromoform, methylene chloride, methylene bromide, methylene iodide, allyl bromide, trichloro ethylene, tetrachloro ethane, perchloro ethylene, hexachloro ethane, hexachloro hexylene and tetrabromo butane.

In practicing the invention, good results have been obtained in the use of an antimony fluorinating catalyst. Antimony compounds which are preferably used for this purpose are the antimony halides and particularly pentavalent antimony halides. As examples of such catalysts may be mentioned compositions represented empirically by

in which $x$ is a positive value less than 5 and Hal represents a halogen other than fluorine. This type of catalyst is representative of a halide of a metal whose halide has the property of mutually exchanging its halogen with hydrogen fluoride and whose fluoride has the property of mutually exchanging halogen with a halogenated acyclic hydrocarbon. As indicated by Example III, the process may be effected by passing hydrogen fluoride into antimony pentachloride and the halogenated acyclic hydrocarbon. The catalyst may also contain trivalent antimony halides. Especially desirable results have been obtained in the addition of catalysts having the general empirical

in which $x$ is a positive value less than 5. In general, it is desirable that $x$ have a value within the range of about one to about three. Such catalysts may be prepared, for example, by passing hydrogen fluoride into antimony pentachloride until the proportion of fluorine in the product is within the range of about 6.0% to about 20.0%.

As previously indicated, the proportions of catalyst employed in accordance with the present invention should be relatively small as compared with the proportions of the original halogenated methane compound to be fluorinated. Generally speaking, it is preferable to use not less than about 2.0% and not more than about 25.0% of catalyst, based on the weight of the original halogenated methane. Especially desirable results, as, for example, in the preparation of monofluorochloro methanes containing at least two chlorine atoms, have been obtained in the use of about 6.0% to about 12.0% of catalyst, based on the weight of the original halogenated methane.

A free halogen, as, for example, chlorine or bromine, may be present or may be added at any time during the fluorination reaction. It is desirable to have a free halogen present when substitution of hydrogen by the halogen takes place and when the pentavalent antimony catalyst is reduced to trivalent form.

The term "hydrogen fluoride" unless otherwise indicated is intended to include and cover not only the pure product but also hydrogen fluoride or hydrofluoric acid which may contain small amounts of impurities as, for example, water.

The proportions of hydrogen fluoride and the rate of introduction into the reaction zone may be varied within relatively wide limits. The rate of introduction of the hydrogen fluoride should preferably be such as to maintain an efficient utilization in the reaction. If the rate of introduction is relatively high, a large proportion of the hydrogen fluoride may pass through the reaction mixture unchanged. On the other hand, too slow a rate of introduction will increase the reaction time undesirably. It will be recognized that the rate of introduction may vary, depending upon the volume of the reaction mixture, the nature of the compound fluorinated and the conditions of reaction. In general, in operating under atmospheric pressure in accordance with the preferred temperature conditions, good results have been obtained in the introduction of hydrogen fluoride into the reaction zone at an hourly rate corresponding to about 0.1% to 1.0% of the weight of the halogenated acyclic hydrocarbon which is fluorinated.

The fluorination reaction is preferably carried out with the halogenated acyclic hydrocarbon derivative in liquid phase and the catalyst dissolved or suspended therein. When the catalyst is not completely soluble in the halogenated methane, the use of agitation is of special advantage. If desired, the fluorination may be effected in the presence of a relatively inert solvent or suspension medium such as, for example, a fluorinated compound which is liquid at the temperatures of operation and is not substantially vaporized. Hydrogen fluoride may be introduced into the reaction zone as a liquid but is preferably introduced as a vapor.

In carrying out the process of the invention, the temperatures may vary widely, depending largely upon the acyclic hydrocarbon derivative fluorinated. It has been found that good results may be obtained by effecting fluorination of halogenated methanes at a temperature within the range of about 0° C. to about 60° C. Especially desirable results, as, for example, in the fluorination of chloroform and carbon tetrachloride, have been obtained in effecting the reaction at temperatures within the range of about 15° C. to about 30° C. When the desired product boils at a temperature not much above the reaction temperature, it will be removed from the reaction mass, and the process may be operated continuously. When the boiling point of the product is appreciably higher than that of the reaction, the operation is normally interrupted and the product is removed by some suitable means, such as by distillation at a higher temperature or by crystallization. If desired, the acidity and the antimony halides may first be removed by suitable washing, as with water or alkaline solutions.

The pressure may be atmospheric, sub-atmospheric or super-atmospheric and, in general, may be adapted to the boiling temperatures of the components or products. Thus, for the fluorination of compounds which are liquid at normal temperatures, as, for example, chloroform and carbon tetrachloride, atmospheric pressure may be employed. For the fluorination of compounds which are gaseous at the reaction temperatures, super-atmospheric pressures are preferably employed in order to maintain such compounds in the liquid phase.

In effecting the fluorination with an antimony halide catalyst, it may be desirable to scrub the evolved reaction gases with a portion of the halogenated acyclic hydrocarbon which is being fluorinated. This scrubbing liquid removes some unfluorinated halogenated hydrocarbon from the reaction gases. It may be returned to the reaction zone intermittently or continuously, as desired. As previously indicated, the reaction gases may be further purified in any suitable manner, e. g., by passing them through a water scrubber and/or dilute aqueous solutions of alkali metal hydroxides to remove acidic gases, and then through concentrated sulfuric acid to remove water vapor. If desired, as, for example, in the fluorination of carbon tetrachloride or chloroform, the reaction gases may be subjected to a preliminary condensation to separate the unconverted halogenated methane which may then be returned to the reaction zone. Alternatively, the reaction gases may be purified and the resultant vapors be entirely condensed, the condensate being then subjected to fractional distillation to recover the fluoro methane and any unconverted halogenated methane which may be returned to the reaction zone.

In purifying the reaction gases by passing them through the various scrubbing liquids, the temperature of the scrubbing liquids should preferably be so regulated as to avoid condensation of the fluorinated product. Where the reaction gases are scrubbed with a liquid halogenated acyclic hydrocarbon, however, the proportions of unconverted halogenated acyclic hydrocarbon removed from the reaction gases may be increased by cooling.

The products of the invention are useful for various purposes. Certain of the products are especially desirable for use as refrigerants.

The process is advantageous in that it offers a practical and economical method of producing fluorinated products of the character described, especially monofluoro derivatives, while avoiding the production of large quantities of more highly fluorinated products and the difficulties and expense attending the separation of such compounds from the reaction gases. Heretofore, it has been customary in the manufacture of fluorinated aliphatic hydrocarbons to introduce the hydrogen fluoride and the compound to be fluorinated into a relatively large amount of the antimony catalyst. According to the present invention only a relatively small amount of catalyst, as compared with halogenated hydrocarbon is required. The use of such small amounts of catalyst greatly reduces the cost of the operation and of the equipment.

As many apparently widely different embodiments of this invention may be made without departing from the spirit and scope thereof, it is to be understood that we do not limit ourselves to the specific embodiments thereof except as defined in the following claims.

We claim:

1. In a process of producing fluorinated acyclic hydrocarbons, the step which comprises passing hydrogen fluoride into a mixture of liquid halogenated acyclic hydrocarbon not containing fluorine and about 2.0% to about 25.0%, based on the weight of the halogenated acyclic hydrocarbon, of a pentavalent antimony halide.

2. In a process of producing monofluoro derivatives of methane, the step which comprises passing hydrogen fluoride into a mixture of liquid halogenated methane not containing fluorine and about 2.0% to about 25.0%, based on the weight of halogenated methane, of a pentavalent antimony halide.

3. In a process of producing mixed halogen derivatives of acyclic hydrocarbons containing less fluorine than other halogens, the step which comprises passing hydrogen fluoride into a halogenated acyclic hydrocarbon not containing fluorine but containing at least three other halogen atoms, and containing about 2.0% to about 25.0%, based on the weight of the halogenated acyclic hydrocarbon, of a pentavalent antimony halide, and effecting the reaction in liquid phase.

4. In a process of producing a halogenated acyclic hydrocarbon having one atom of fluorine and at least two atoms of chlorine, the step which comprises passing hydrogen fluoride into a chloroacyclic hydrocarbon not containing fluorine, having at least three atoms of chlorine, and containing about 2.0% to about 25.0%, based on the weight of the chloro acyclic hydrocarbon, of a pentavalent antimony halide containing chlorine, and effecting the reaction in liquid phase.

5. In a process of producing a halogenated methane having one atom of fluorine and at least two atoms of chlorine, the step which comprises passing hydrogen fluoride into a chloro methane having at least three atoms of chlorine and containing about 2.0% to about 25.0%, based on the weight of said chloro methane, of a pentavalent antimony halide containing chlorine, and maintaining a temperature in the reaction zone within the range of about 0° C. to about 40° C.

6. In a process of producing monofluorodichloro methane, the step which comprises reacting hydrogen fluoride with chloroform in the presence of about 2.0% to about 25.0%, based on the weight of chloroform, of a pentavalent antimony fluorochloride having the empirical formula:

$$SbF_xCl_{5-x}$$

in which $x$ is a positive value less than 5, and maintaining a reaction temperature within the range of about 0° C. to about 40° C.

7. In a process of producing monofluorotrichloro methane, the step which comprises reacting hydrogen fluoride with carbon tetrachloride in the presence of about 2.0% to about 25.0%, based on the weight of carbon tetrachloride, of a pentavalent antimony fluorochloride having the empirical formula:

$$SbF_xCl_{5-x}$$

in which $x$ is a positive value less than 5, and maintaining a reaction temperature within the range of about 0° C. to about 40° C.

8. In a process of producing monofluorodichloro methane, the step which comprises passing gaseous hydrogen fluoride into chloroform containing about 6.0% to about 12.0%, based on the weight of chloroform, of a pentavalent antimony fluorochloride having the empirical formula:

$$SbF_xCl_{5-x}$$

in which $x$ is a positive value within the range of about one to about three, and maintaining a reaction temperature of about 15° C. to about 30° C.

9. In a process of producing monofluorotrichloro methane, the step which comprises passing gaseous hydrogen fluoride into carbon tetrachloride containing about 6.0% to about 12.0%, based on the weight of carbon tetrachloride, of a pentavalent antimony fluorochloride having the empirical formula:

$$SbF_xCl_{5-x}$$

in which $x$ is a positive value within the range of about one to about three, and maintaining a reaction temperature of about 15° C. to about 30° C.

10. In a process of producing monofluorodichloro methane, the step which comprises passing hydrogen fluoride into chloroform containing about 6.0% to about 12.0%, based on the weight of chloroform, of a pentavalent antimony fluorochloride having the empirical formula:

$$SbF_xCl_{5-x}$$

in which $x$ is a positive value less than 5, and maintaining a reaction temperature of about 15° C. to about 30° C.

11. In a process of producing monofluorotrichloro methane, the step which comprises passing hydrogen fluoride into carbon tetrachloride containing about 6.0% to about 12.0%, based on the weight of carbon tetrachloride, of a pentavalent antimony fluorochloride having the empirical formula:

$$SbF_xCl_{5-x}$$

in which $x$ is a positive value less than 5, and maintaining a reaction temperature of about 15° C. to about 30° C.

LEE CONE HOLT.
EDWIN LORENZO MATTISON.

CERTIFICATE OF CORRECTION.

Patent No. 2,005,713.   June 18, 1935.

LEE CONE HOLT, ET AL.

It is hereby certified that error appears in the printed specification of the above numbered patent requiring correction as follows: In the heading to the grant, line 1, after "Edgemoor" insert the comma and word , Delaware; page 2, first column, line 50, for "1398°C." read 138°C.; and second column, line 30-31, for "general empirical" read empirical formula; and that the said Letters Patent should be read with these corrections therein that the same may conform to the record of the case in the Patent Office.

Signed and sealed this 16th day of July, A. D. 1935.

Leslie Frazer (Seal)   Acting Commissioner of Patents.